(12) United States Patent
McAuliffe et al.

(10) Patent No.: US 8,657,568 B2
(45) Date of Patent: Feb. 25, 2014

(54) VARIABLE TURBINE NOZZLE AND VALVE

(75) Inventors: Christopher McAuliffe, Windsor, CT (US); John M. Dehais, Windsor, CT (US); Craig M. Beers, Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 982 days.

(21) Appl. No.: 12/762,424

(22) Filed: Apr. 19, 2010

(65) Prior Publication Data

US 2011/0252823 A1 Oct. 20, 2011

(51) Int. Cl.
*F01B 25/02* (2006.01)

(52) U.S. Cl.
USPC .......................................... 415/145; 415/158

(58) Field of Classification Search
USPC .......... 415/144, 145, 151, 156, 157, 158, 167
See application file for complete search history.

(56) References Cited

U.S. PATENT DOCUMENTS

| | | | |
|---|---|---|---|
| 4,292,807 A | 10/1981 | Rannenberg | |
| 5,178,513 A | 1/1993 | Trommer et al. | |
| 5,249,934 A | 10/1993 | Merritt et al. | |
| 5,311,749 A | 5/1994 | McAuliffe et al. | |
| 5,784,894 A | 7/1998 | Army, Jr. et al. | |
| 6,505,474 B2 | 1/2003 | Sauterleute et al. | |
| 6,679,057 B2 | 1/2004 | Arnold | |
| 6,810,666 B2 * | 11/2004 | Lutz et al. | 60/602 |
| 6,925,806 B1 | 8/2005 | Zollinger et al. | |
| 2006/0059942 A1 | 3/2006 | McAuliffe et al. | |
| 2006/0067833 A1 | 3/2006 | McAuliffe et al. | |
| 2007/0134105 A1 | 6/2007 | Beers et al. | |
| 2010/0037605 A1 * | 2/2010 | Garrett et al. | 60/602 |

FOREIGN PATENT DOCUMENTS

WO 2009009735 1/2009

* cited by examiner

*Primary Examiner* — Edward Look
*Assistant Examiner* — Jason Davis
(74) *Attorney, Agent, or Firm* — Kinney & Lange, P.A.

(57) ABSTRACT

An air cycle machine includes a turbine wheel, a turbine inlet nozzle, a valve body, and a poppet member. The turbine wheel is mounted to rotate within the air cycle machine and the turbine inlet nozzle is positioned to direct airflow thereto. The poppet member selectively extends into the turbine inlet nozzle and the valve body controls a pressure on the poppet member to move the poppet member relative to the turbine inlet nozzle to vary the size of the turbine nozzle directing airflow to the turbine wheel.

20 Claims, 3 Drawing Sheets

VARIABLE TURBINE NOZZLE AND VALVE

BACKGROUND

The present application relates to turbomachines, and more particularly, to turbomachines for use in aircraft environmental control systems.

Aircraft environmental control systems incorporate turbomachines, commonly referred to as an air cycle machines, to help facilitate cooling and dehumidifying air for supply to a cabin of an aircraft. Air cycle machines can comprise two or more wheels, which comprise at least one compressor and at least one turbine, disposed axially along the same shaft. On aircraft powered by gas turbine engines, the air to be conditioned in the air cycle machine is generally either compressed air bled from one or more of the compressor stages of the gas turbine engine, or air diverted from another location on the aircraft. With either system, the air is passed through the compressor(s) of the air cycle machine where it is further compressed, and then passed through a heat exchanger to cool the compressed air sufficiently to condense moisture therefrom. The dehumidified air continues through the environmental control system back to the turbine(s) of the air cycle machine. In the turbine(s), the air is expanded to both extract energy from the compressed air so as to drive the shaft (and the compressor(s) coupled thereto) and cool the air for use in the cabin as conditioned cooling air.

To meet required specifications for providing fresh air and maintain pressurization to the cabin during flight, environmental control systems on larger aircraft employ two separate (dual) air conditioning packs. Unfortunately, operating dual air conditioning packs may not be necessary or efficient in some circumstances such as when the plane is on the tarmac. In this instance and others, operating only a single air conditioning pack could accomplish the conditioning of air for the cabin.

SUMMARY

An air cycle machine includes a turbine wheel, a turbine inlet nozzle, a valve body, and a poppet member. The turbine wheel is mounted to rotate within the air cycle machine and the turbine inlet nozzle is positioned to direct airflow to the turbine wheel. The poppet member selectively extends into the turbine inlet nozzle and the valve body controls a pressure on the poppet member to move the poppet member relative to the turbine inlet nozzle to vary the size of the turbine nozzle directing airflow to the turbine wheel.

DETAILED DESCRIPTION

Figure 1:
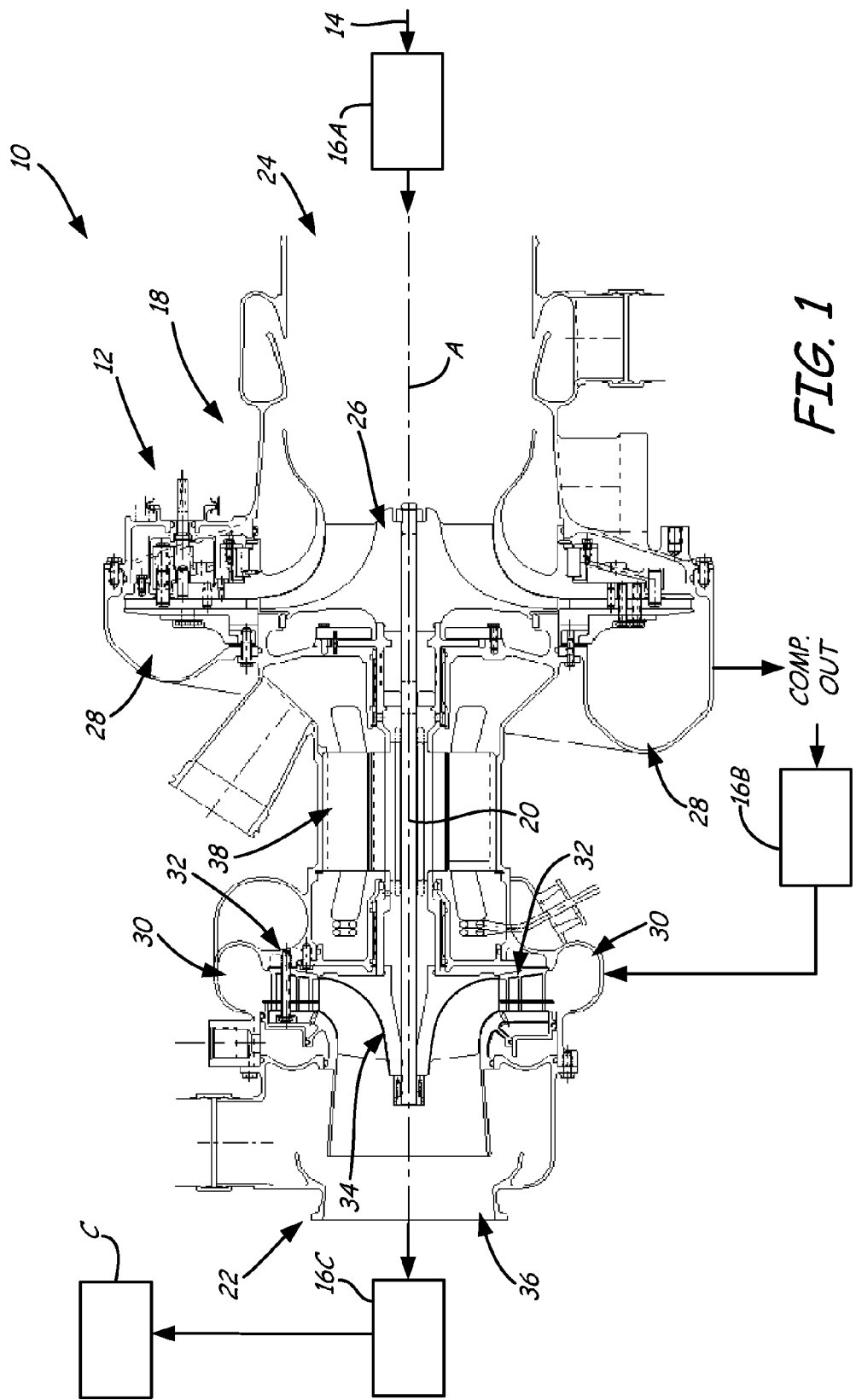
FIG. 1 is a schematic view of an air cycle machine for an environmental control system of an aircraft.

FIG. 1 shows a schematic view of an environmental control system (ECS) 10. The environmental control system 10 includes an air cycle machine 12 that receives air 14 that is conditioned by various devices symbolically indicated as 16A, 16B, and 16C to produce air flow at a desired temperature and pressure for aircraft cabin C. The air cycle machine 12 includes a compressor section 18, a shaft 20, and a turbine section 22. The compressor section 18 has a compressor inlet 24, a compressor wheel 26, and a compressor outlet 28. The turbine section 22 includes a turbine inlet 30, turbine inlet nozzle 32, turbine wheel 34, and turbine outlet 36.

System air 14 is bled from one or more of the compressor stages of the gas turbine engines of the aircraft or directed from an air source at another location on the aircraft. One or more devices 16A can condition (e.g., preheat, acoustically treat) the air 14 prior to its entry into the air cycle machine 12. The air 14 enters the air cycle machine 12 at the compressor section 18 through the compressor inlet 24. The air 14 is compressed to a higher pressure by the compressor wheel 26 which is mounted on the shaft 20 for rotation about axis A. The compressed air 14 is output to the remainder of the environmental control system 10 via the compressor outlet 28. Air 14 output from the compressor section 18 is conditioned by various devices 16B to change the characteristics of the air 14 that enters the turbine section 22 via the turbine inlet 30. These devices 16B can include heat exchangers, condensers, and/or water extractors/collectors that condition the air 14 to a desired pressure and temperature.

The turbine inlet nozzle 32, receives air 14 entering the air cycle machine 12 through the inlet 30 and is disposed adjacent the turbine wheel 34 to direct the flow of air 14 thereto. As will be discussed subsequently, the air cycle machine 12 is configured with a valve to vary the size of turbine inlet nozzle 32 as desired to better optimize the efficiency of the environmental control system 10. In particular, the selectively variable turbine inlet nozzle 32 disclosed herein allows the power consumption of the environmental control system 10 to be reduced, for example, by operating only a single air conditioning pack to condition the cabin rather than operating two air conditioning packs in some instances.

The turbine wheel 34 is mounted on the shaft 20 to drive rotation of the shaft 20 and compressor wheel 26 about axis A. After passing through the turbine inlet nozzle 32 the air 14 is expanded to both extract energy from the air 14 so as to drive the shaft 20 and the compressor wheel 26 (in combination with a motor 38 mounted along the shaft 20 in some embodiments) and to cool the air 14 to prepare it for the cabin. After expansion, the air 14 passes through the turbine outlet 36 out of the air cycle machine 12. The air 14 can pass through one or more devices 16C (e.g., heat exchangers, compact mixers, and/or acoustic treatment devices) before reaching the cabin C at the desired temperature and pressure.

Figure 2A:
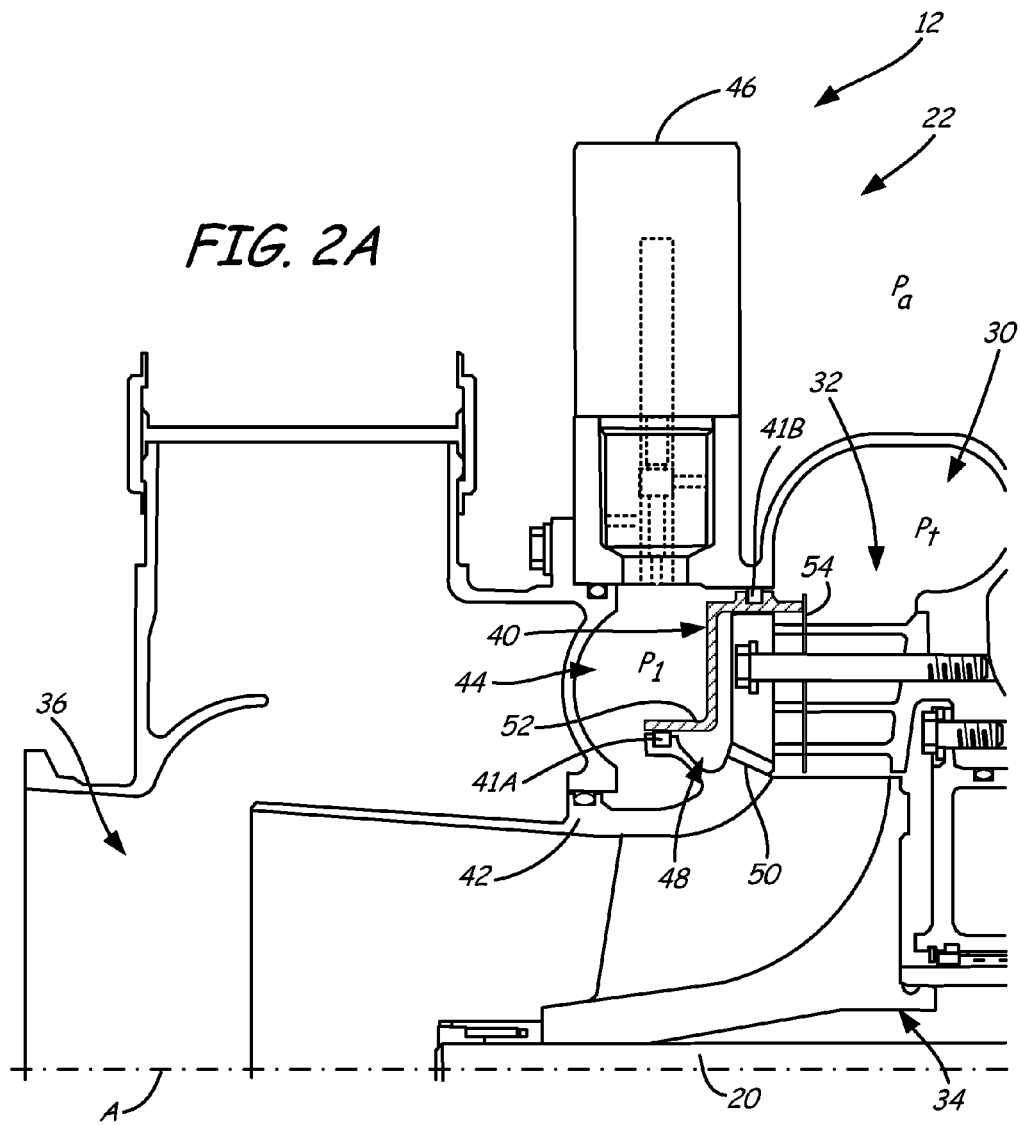
FIG. 2A is an enlarged view of a turbine inlet nozzle of the air cycle machine with a poppet member in a first position.

FIG. 2A is an enlarged view of the turbine section 22 with a poppet member 40 disposed in a first position extending into the turbine inlet nozzle 32. In addition to the turbine inlet 30, the turbine inlet nozzle 32, the turbine wheel 34, the turbine outlet 36, and the poppet member 40, the turbine section 22 includes a shroud 42, a first cavity 44, a valve body 46, and a second cavity 48. The shroud 42 has a passage 50. The poppet member 40 includes a main body 52 and seals 41A and 41B. An arcuate plate 54 is fixed within the turbine inlet nozzle 32.

As illustrated in FIG. 2A, the poppet member 40 is slidably mounted on the stator shroud 42 and is configured to seal the first cavity 44 from the turbine inlet nozzle 32. In particular, seals 41A and 41B are disposed between the poppet member 40 and the shroud 42 to allow for pressurization of the first cavity 44. The first cavity 44 serves as an annular plenum that is defined by portions of the shroud 42, the poppet member 40, the valve body 46, and other portions of the casing of the air cycle machine 12. The valve body 46 is mounted in fluid communication with the first cavity 44.

The valve body 46 can be any valve commonly known in the art for selectively communicating air from two ports (two pressure sources) to a third port. The valve body 46 can be controlled to move a member between a first position that blocks a first of the three ports and allows the second and third ports to be in fluid communication, and a second position that blocks the second port and allows the first and third ports to be in fluid communication. The valve body 46 is controlled to vary the pressure in the first cavity 44 between a first pressure $P_1$, equal to or about equal to the pressure $P_t$ within the turbine inlet 30 (illustrated in FIG. 2A), and a second lower pressure $P_2$, equal to or about equal to an ambient pressure $P_a$ external to the environmental control system 10 and air cycle machine 12 (illustrated in FIG. 2B). Thus, the valve body 46 is selectively controlled to allow for fluid communication between the first cavity 44 and either the turbine inlet 30 or the ambient air source external to the air cycle machine 12. In the first position shown in FIG. 2A, the first cavity 44 is in fluid communication with the turbine inlet 30. The higher first pressure $P_1$ that results from this arrangement forces the poppet member 40 outward expanding the volume of the first cavity 44. Thus, in the first position, the poppet member 40 extends from the first cavity 44 into the turbine inlet nozzle 32 to reduce the size (volume and/or cross-sectional area) of the inlet turbine nozzle 32 that receives air 14 from the turbine inlet 30. In this position, the poppet member 40 restricts the flow of air 14 to the turbine wheel 34. The reduced air flow to the turbine wheel 34 maybe desirable in some instances, for example, if it is necessary to operate both air conditioning packs to maintain the cabin at a desired pressure and temperature.

The second cavity 48 is defined by the shroud 42 and the poppet member 40 and is positioned radially outward of the turbine wheel 34 with respect to axis A. The poppet member 40 separates the first cavity 44 from the second cavity 48. The passage 50 through shroud 42 allows the second cavity 48 to be in fluid communication with the turbine inlet nozzle 32 immediately adjacent to the turbine wheel 34. This arrangement allows the second cavity 48 to be maintained at or about the static pressure experienced within the turbine inlet nozzle 32 immediately adjacent to the turbine wheel 34. This static pressure is lower than the pressure at the turbine inlet 30 (and selectively the pressure of the first cavity 44) but greater than the ambient pressure external to the air cycle machine 12 (and selectively the pressure of the first cavity 44), which allows for actuation of the poppet valve 40.

The poppet valve 40 includes a main body 52 that is mounted on the shroud 42 and configured to seal and separate the first cavity 44 from the second cavity 48. The main body 52 is actuated as discussed to slide relative to shroud 42. In the first position shown in FIG. 2A, the main body 52 extends from the first cavity 44 and shroud 42 into the turbine inlet nozzle 32. The arcuate plate 54 is fixed to the turbine inlet nozzle 32 and divides the turbine inlet nozzle into two sections. The plate 54 is aligned within the turbine inlet nozzle 32 so as to minimally interfere with the direction of airflow toward the turbine wheel 34. In particular, the plate 54 is configured with a small cross-sectional area interfacing the airflow and has a larger surface that extends generally parallel to one of the walls of the turbine inlet nozzle 32. The plate 54 extends generally radially to immediately adjacent the turbine wheel 34, thereby, dividing the turbine inlet nozzle 32 into a primary section (through which air 14 flows when the poppet member 40 is in the first position illustrated in FIG. 2A) and a secondary section (through which air 14 generally does not pass when the poppet member 40 is in the first position).

Figure 2B:
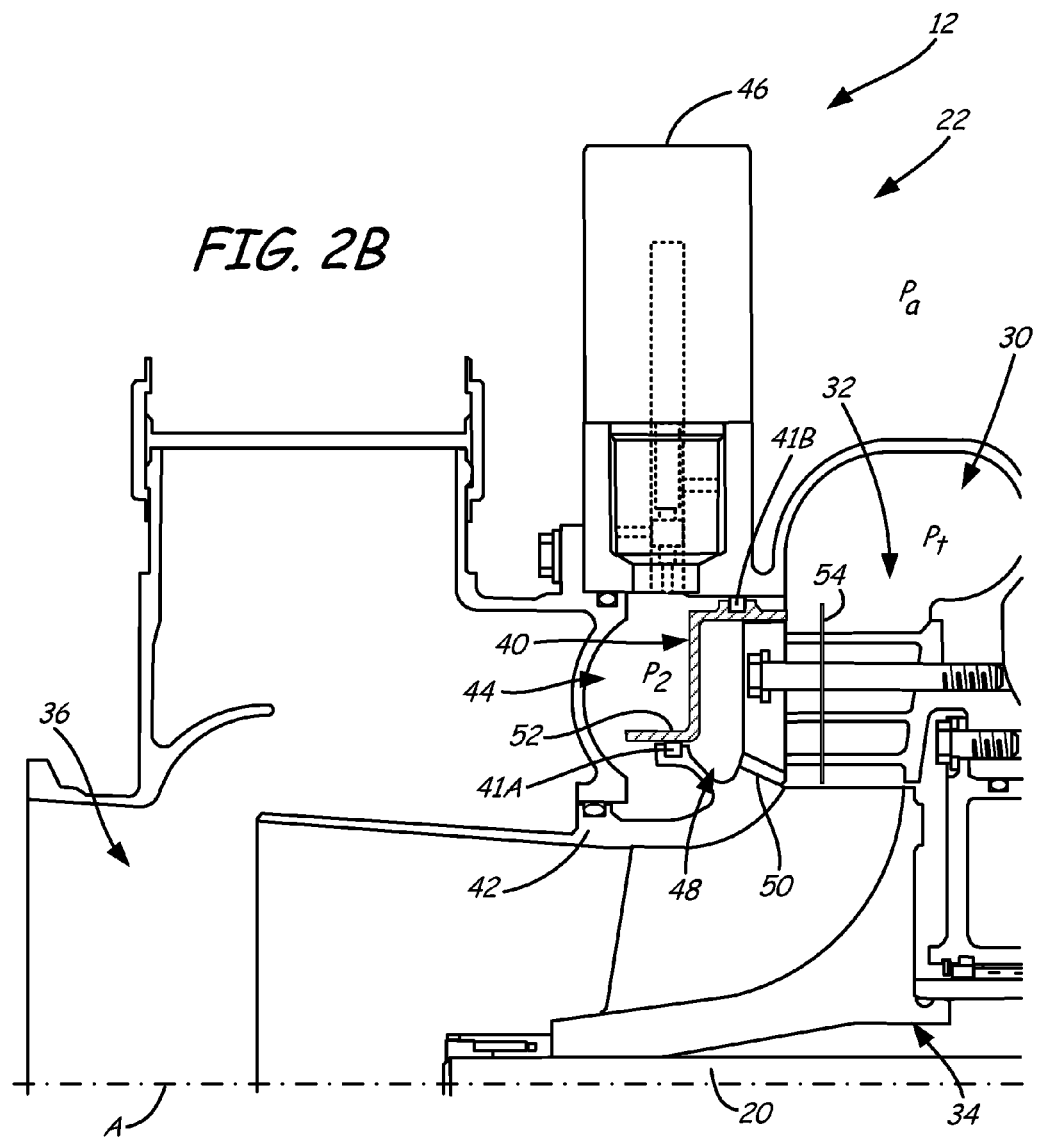
FIG. 2B is an enlarged view of the turbine inlet nozzle of the air cycle machine with the poppet member in a second position.

FIG. 2B is an enlarged view of the turbine section 22 with the poppet member 40 disposed in a second position. In the second position, the first cavity 44 is in fluid communication with the ambient air source external to the air cycle machine 12. As a result of this arrangement, the pressure within the second cavity 48 (the static pressure) exceeds the second pressure $P_2$ within the first cavity 44 and the poppet member 40 moves decreasing the volume of the first cavity 44 and increasing the volume of the second cavity 48. The movement of the main body 52 of the poppet member 40 within the first cavity 44 retracts main body 52 from at least a portion of the turbine inlet nozzle 32, allowing airflow through the secondary section of the turbine inlet nozzle 32, thereby increasing the size (volume and/or cross sectional area) of the turbine inlet nozzle 32 through which air 14 flows to the turbine wheel 34. Thus, in the second position shown in FIG. 2B virtually the entire airflow passes through the turbine inlet nozzle 32 unrestricted by the poppet member 40 to the turbine wheel 34.

By varying the pressure of the first cavity 44 in the manner disclosed to selectively move the poppet member 40 within the turbine inlet nozzle 32, the efficiency of the environmental control system 10 can be improved. In particular, selectively moving the poppet member 40 to vary the size of the turbine inlet nozzle 32 when desired allows the power consumption of the environmental control system 10 to be reduced, for example, by operating only a single air conditioning pack to condition the cabin rather than operating both air conditioning packs.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air cycle machine, comprising:
a turbine wheel mounted to rotate within the air cycle machine;
a turbine inlet nozzle in fluid communication with the turbine wheel to direct airflow thereto;
a poppet member that selectively extends into the turbine inlet nozzle, the poppet member having a generally s-shaped cross-section; and
a valve body that controls a pressure on the poppet member to move the poppet member relative to the turbine inlet nozzle to vary the size of the turbine inlet nozzle directing airflow to the turbine wheel.

2. The air cycle machine of claim 1, wherein the pressure comprises one of a turbine inlet pressure or an ambient pressure on the air cycle machine.

3. The air cycle machine of claim 1, wherein the air cycle machine has a cavity that is in fluid communication with the valve body.

4. The air cycle machine of claim 3, wherein the valve body selectively communicates air to the cavity from either a turbine inlet or a source external to the air cycle machine.

5. The air cycle machine of claim 3, wherein the poppet member is disposed within the cavity and selectively extends therefrom into the turbine inlet nozzle.

6. The air cycle machine of claim 5, wherein the air cycle machine has a second cavity that communicates with the turbine inlet nozzle immediately adjacent the turbine wheel.

7. The air cycle machine of claim 6, wherein the second cavity is defined by the poppet member and a shroud and the second cavity is maintained at a static pressure during operation.

8. The air cycle machine of claim 3, wherein the poppet member selectively extends from the cavity into the turbine inlet nozzle to contact an arcuate plate that is fixed to and divides the turbine inlet nozzle into at least two sections.

9. The air cycle machine of claim 8, wherein the poppet member and the arcuate plate restrict the airflow to a section of the turbine inlet nozzle when the cavity is a first pressure and the poppet member contacts the arcuate plate.

10. The air cycle machine of claim 8, wherein the arcuate plate and poppet member do not restrict a substantial portion of the airflow in the turbine nozzle when the cavity is a second pressure and the poppet member is not in contact with the arcuate plate.

11. An environmental control system, comprising:
an air cycle machine having a compressor wheel and a turbine wheel mounted on a common shaft for rotation therewith, the air cycle machine including a poppet member disposed adjacent the turbine wheel, the poppet member including a first member extending towards a turbine nozzle inlet, the first member in contact with a first seal, a second member extending away from the turbine nozzle inlet, the second member in contact with a second seal, and a third member connecting a first end of the first member and a first end of the second member, the third member being outside the turbine nozzle inlet, and a valve body that controls a pressure on the poppet member to vary an amount of airflow to the turbine wheel.

12. The environmental control system of claim 11, wherein the pressure comprises one of a turbine inlet pressure or an ambient pressure external to the environmental control system.

13. The environmental control system of claim 11, wherein the air cycle machine has a cavity that is in fluid communication with the valve body.

14. The environmental control system of claim 13, wherein the valve body selectively communicates air to the cavity from either a turbine inlet or a source external to the environmental control system.

15. The environmental control system of claim 13, wherein the poppet member is disposed within the cavity and selectively extends therefrom into a turbine inlet nozzle adjacent the turbine wheel.

16. The environmental control system of claim 15, wherein the air cycle machine has a second cavity that communicates with the turbine inlet nozzle immediately adjacent the turbine wheel.

17. The environmental control system of claim 16, wherein the second cavity is defined by the poppet member and a shroud and the second cavity is maintained at a static pressure during operation.

18. The environmental control system of claim 15, wherein the poppet member selectively extends from the cavity into the turbine inlet nozzle to contact an arcuate plate that is fixed to and divides the turbine inlet nozzle into at least two sections.

19. The environmental control system of claim 18, wherein the poppet member and the arcuate plate restrict the airflow to a section of the turbine inlet nozzle when the cavity is a first pressure and the poppet member contacts the arcuate plate.

20. The environmental control system of claim 18, wherein the arcuate plate and poppet member do not restrict a substantial portion of the airflow in the turbine nozzle when the cavity is a second pressure and the poppet member is not in contact with the arcuate plate.

\* \* \* \* \*